United States Patent
Frybarger

(10) Patent No.: US 10,614,475 B2
(45) Date of Patent: Apr. 7, 2020

(54) INTERACTIVE WASTE RECEPTACLE

(71) Applicant: Scott Joseph Frybarger, Hollywood, FL (US)

(72) Inventor: Scott Joseph Frybarger, Hollywood, FL (US)

(73) Assignee: Smarter Trash, Inc., Lenoir, NC (US)

( * ) Notice: Subject to any disclaimer, the term of this patent is extended or adjusted under 35 U.S.C. 154(b) by 1348 days.

(21) Appl. No.: 14/092,480

(22) Filed: Nov. 27, 2013

(65) Prior Publication Data

US 2015/0144012 A1 May 28, 2015

(51) Int. Cl.
*G06Q 30/02* (2012.01)
*B30B 15/26* (2006.01)
*B30B 9/30* (2006.01)

(52) U.S. Cl.
CPC ....... *G06Q 30/0207* (2013.01); *B30B 9/3007* (2013.01); *B30B 15/26* (2013.01); *G06Q 30/0241* (2013.01)

(58) Field of Classification Search
CPC ..... B30B 9/3007; B30B 15/26; B65F 1/1405; B65F 1/1426
See application file for complete search history.

(56) References Cited

U.S. PATENT DOCUMENTS

| | | | | |
|---|---|---|---|---|
| 5,022,553 A * | 6/1991 | Pontius | ............... | B65F 1/14 119/169 |
| 5,690,025 A * | 11/1997 | Hawkins | ............... | B30B 1/34 100/229 A |
| 5,793,281 A * | 8/1998 | Long | ............... | G09F 25/00 340/328 |
| 6,578,762 B1 * | 6/2003 | Knappmiller | ............... | B65F 1/10 235/380 |
| 6,701,832 B1 * | 3/2004 | Hawkins | ............... | B30B 9/3007 100/215 |
| 6,873,710 B1 * | 3/2005 | Cohen-Solal | ............... | G11B 27/10 382/100 |

(Continued)

OTHER PUBLICATIONS

Google Definition—Sensor_March 31, 2018.*

*Primary Examiner* — Shelley M Self
*Assistant Examiner* — Jared O Brown
(74) *Attorney, Agent, or Firm* — Scott D. Smiley; Scott M. Garrett; The Concept Law Group, P.A.

(57) ABSTRACT

An interactive waste receptacle combines a waste receptacle, a display device, a sensor, a camera, a speaker, and a variety of interactive media to receive and process waste, and perform an assortment of interactive functions in a public venue. The interactive waste receptacle detects events from a user, and responds to the events with interactive functions, including; receiving, compacting, and processing a waste; detecting proximal images, sounds, and smells; and displaying advertisements, text, graphics, animation, video, audio, and games. The waste receptacle receives and compacts the waste. A display device integrated with the waste receptacle displays images of advertising, messages, and pertinent information. A sensor detects events from the user. A camera records a user image. A speaker emits and receives audio signals to the user. Interactive media also record user events. The sensor, camera, speaker, and interactive media perform an interactive function in response to the event.

12 Claims, 6 Drawing Sheets

(56) References Cited

U.S. PATENT DOCUMENTS

| | | | | |
|---|---|---|---|---|
| 7,096,780 B1* | 8/2006 | Hawkins | ............... | B30B 9/3007 100/215 |
| 8,487,772 B1* | 7/2013 | Higgins | ............. | G06Q 30/0201 340/573.1 |
| 2004/0199401 A1* | 10/2004 | Wagner | ................... | B07C 7/005 235/385 |
| 2008/0190953 A1* | 8/2008 | Mallett | ................... | A61L 11/00 221/13 |
| 2008/0296374 A1* | 12/2008 | Gonen | ................. | B65F 1/1484 235/385 |
| 2012/0168354 A1* | 7/2012 | Sundholm | ............. | B07C 5/3412 209/10 |
| 2013/0278067 A1* | 10/2013 | Poss | ...................... | B65F 1/0033 307/62 |
| 2016/0078414 A1* | 3/2016 | Rathore | ................ | G06Q 10/30 705/308 |

* cited by examiner

INTERACTIVE WASTE RECEPTACLE

FIELD OF THE INVENTION

The present invention relates generally to an interactive waste receptacle, and more particularly relates to a waste receptacle that automatically receives and compacts waste, and performs interactive functions in response to user events.

BACKGROUND OF THE INVENTION

The present invention relates generally to an automatically compacting waste receptacle that performs interactive functions in high-traffic public venues.

Automatically compacting waste and recycling receptacles reduce costs associated with waste services and lower the carbon footprint by reducing the frequency that garbage must be emptied. In addition, waste compactor receptacles located on the premises of public venues, such as airport terminals and parks, for example, significantly reduce the costs of labor associated with continuously monitoring the garbage level of each waste can.

When these waste receptacles become full, an attendant must remove the top of the waste receptacle and empty the contents into a larger bin for transport to a collection site from which the waste is removed from the premises to a disposal facility. The type of waste that the public disposes in the waste receptacle typically occupy a relatively large volume and low density, as it consists largely of items such as beverage receptacles, cups composed of plastic or styrofoam, papers, and the like. Because this type of waste occupies a relatively large volume for its weight, attendants must frequently empty the waste receptacle to prevent the waste from overflowing the receptacle and clogging the opening in the top of the waste receptacle of the waste can. Because of the volume of waste in each waste can, a single attendant cannot empty very many waste receptacles in a single circuit of the attendant's assigned area. This disability limits the number of waste receptacles that can be monitored by any one attendant during the time span in which each can is expected to.

In the past, it has been known to provide static ink-based advertising on the waste compactor because the mere presence of the waste compactor placed in high traffic areas in public allows a person, such as the owner of waste compactor and/or the owner of the real estate, to generate a revenue stream from displaying advertisements on the body of the waste compactor. However, ink-based advertising is not as attractive as newer forms of advertisements, such as advertisements on a LED, LCD or E-ink screen. These newer forms provide myriad advantages, including, interactive engagements with the viewer and the collection of information.

Many people are used to being captured on surveillance video in the bank, at the convenience store, in the mall, and numerous other public places. Currently authorities can match those images with police mug shots, driver's license photos, and others to find criminal suspects. Although not as specific as DNA or fingerprints, where investigators compare evidence to a database and get a single match, the facial recognition system uses unbiased mathematics that provides a solid tip for detectives.

In order to capture quality images for facial recognition, the camera should be directly in front of the subject. That is, the camera should be in a position where the subject looks directly at it. However, in most public places, surveillance cameras are attached near the ceiling, and look down on those that walk by. To avoid detection, one merely needs to look at the floor as they walk by.

In the past, it is known to provide incentives for residential based recycling. In residential based recycling programs, the resident places recyclables into a recycle can that is micro chipped. When the waste management services pick up the recyclables curbside, the recycling truck will read the microchip to identify the recycle container and associate the recycle container with the resident's account. Next, the recycle truck will weigh the recycle container prior to emptying, and bill the resident's account in accordance with the weight of the recyclable.

Therefore, a need exists to overcome the problems with the prior art as discussed above.

SUMMARY OF THE INVENTION

The present invention obviates the above-mentioned problems, by providing an interactive waste receptacle that receives and processes waste, performs interactive functions, and relays information through a host of interactive communications with a user. The interactive waste receptacle combines a waste receptacle, a display device, a sensor, a camera, a speaker, and a variety of interactive media. The interactive waste receptacle detects events from a user, and responds to the events with an interactive function, including; receiving, compacting, and processing a waste; detecting proximal images, sounds, and smells; and displaying content such as advertisements, text, graphics, animation, video, audio, and games. The interactive waste receptacle is efficacious for providing numerous interactive functions in a public venue, including, without limitation, collecting and processing recyclable waste, advertising electronically, capturing data, recognizing facial features, providing electronic communication, interacting with users, detecting bombs, calculating carbon emission, incentivizing recycling, and determining a location of a user.

The waste receptacle is sized and dimensioned to receive and/or compact waste in a public venue. The waste receptacle may be selective in the type of waste received. The waste may include general garbage refuse, or specific recyclable waste. The waste receptacle comprises a waste intake aperture, which is covered by a movable hatch. The waste intake aperture directs waste into an internal chute disposed within the waste receptacle. The internal chute transports waste from the waste intake aperture to a lower portion of the waste receptacle. A mechanism for automatically compacting the waste in the lower portion is provided within the waste receptacle. The waste reception and compacting components function in response to detections and triggers generated by the sensor and the interactive media.

In some embodiments, the waste receptacle utilizes at least one sensor for detecting an event by a user, and then actuating an appropriate response. The event can be a user moving in proximity to the waste intake aperture to deposit the waste. For example, the hatch covers the waste intake aperture. A motion sensor positioned on the waste receptacle detects a proximal object, such as a user's hand holding waste, and triggers the hatch to move to an open position. The user may then deposit the waste through the waste intake aperture. The waste receptacle compact the wastes, either immediately in response to the user's action, or at predetermined durations. An internal weight sensor emits a signal to an appropriate waste collection service when a predetermined amount of waste has been deposited into the waste receptacle. The at least one sensor may include, without limitation, a motion sensor, a thermal sensor, a sound sensor, an olfactory sensor, and a weight sensor. Each sensor performs a different interactive function, but still depends on an exterior event to function.

In some embodiments, the waste receptacle may join with a display device for displaying an image for viewing by the user. The display device can be any display device capable of displaying electronic content, for example, an LCD screen. The display device may position above the waste receptacle, forming an integral unit. In some embodiments, the display device is interactive, i.e., a touch screen, and allows users to input data. The image that is displayed by the display device may include, without limitation, a video advertisement, text, graphics, animation, video, audio, and a game. The video advertisement may be a perpetually running video, or a unique video tailored for a user.

A plurality of interactive media operatively join with the waste receptacle. The interactive media record an event from the user, and trigger a responsive function through the waste receptacle and the display device. However, in other embodiments, the waste receptacle may automatically perform certain functions at predetermined durations without interaction with the user or actuation from the interactive media. The interactive media may include, without limitation, a camera, a speaker, face recognition software, near field communication technology, a radio frequency identification tag, and a quick response code.

In another embodiment, the camera works in conjunction with recognition software to record and analyze a specific type of recyclable waste for disposal. For example, without limitation, if the waste receptacle is configured to receive aluminum waste, the hatch will not move to the open position if an image of the recyclable waste does not match the predetermined visual parameters of aluminum, such as a can shape, or a surface reflectivity index. The camera captures the image of the waste, and the recognition software determines the type of recyclable waste. Additionally, a speaker may emit an audio signal of a human voice that informs the user that the interactive waste receptacle only accepts aluminum waste.

In another embodiment, the camera and the recognition software record and analyze physical characteristics of the user, such as hair length, height, adorned jewelry, and facial patterns. The display device may then display an appropriate advertisement or message that may be pertinent to the user based on the image captured by the camera, and commands from the recognition software. For example, if the camera and recognition software detect a user with long hair, the display device may show an advertisement for jewelry or shampoo. If a user who is shorter than four feet is detected, the display device may run an advertisement for a toy or sugar coated cereal on the display device.

In yet another embodiment, the camera and the face recognition software can record and analyze a specific user who may be of interest to a law enforcement department. For example, the interactive waste receptacle may be in communication with a law enforcement database that stores facial images of people that are fugitives from the law. Upon the camera and the face recognition software identifying a matching face, the interactive waste receptacle emits a signal to the law enforcement department indicating that a possible fugitive is in the proximal area.

In other embodiments, additional functions may be performed by the waste receptacle and the display device in response to user events detected by the at least one sensor, and recorded by the camera, the speaker, and the interactive media. In any case, the present invention comprises a two-way system of electronic communications between the user and the interactive waste receptacle for performing eclectic interactive functions in a public venue.

The present invention further provides an improvement for publically accessible areas, such as airports, malls, and others, where outer walls define interior spaces that are publically accessible to a large number of people. As used herein, more than 100 people in a year is considered a large number of people. Within the interior of these buildings, there is usually a walk space accessible to the people. For example, in an airport, the terminals have a center walk space accessible to a large number of people. Similarly, malls have a center walk space between stores that are accessible to a large number of people. In these spaces, a mall or airport terminal, for example, there are a number of waste receptacles disposed along the walk space. Generally, the plurality of waste receptacles are of standard trash can height, or approximately 4.5 feet and have nothing above them, other than the roof of the structure of which they are in. In accordance with an embodiment, the present invention is an improvement that includes a display device disposed on each waste receptacle, the display device configured to display an image for viewing by and possible interaction with the large number of people. Because they are disposed on top of the waste receptacles, they are approximately face level to a person of approximately six feet in height and easy to view by the average person. For the first time, the unused wasted space above a waste receptacle can be used for many valuable purposes that have never before been thought of. Several non-limiting examples of these uses are shown herein and described below. The recited heights of 4.5 feet and 6 feet are merely rough dimensions and should not be used to limit the claimed invention to less than a 50% variance/tolerance of these numbers.

With the foregoing and other objects in view, there is provided, in accordance with the invention, an interactive waste receptacle that includes a waste receptacle, the waste receptacle being configured to accept and compact a waste, the waste receptacle comprising a hatch for regulating access to an internal chute, the internal chute being configured to direct the waste to a lower portion for compacting; at least one sensor, the at least one sensor being configured to detect at least one event from a user for triggering the waste receptacle to perform at least one interactive function; a display device, the display device being disposed to join with the waste receptacle, the display device being configured to display an image for viewing by the user; a camera, the camera being configured to record a user image for performing the at least one interactive function; and a speaker, the speaker being configured to emit an audio signal for performing the at least one interactive function, the speaker further being configured to receive an audio signal for performing the at least one interactive function.

In accordance with another feature, an embodiment of the present invention includes a waste receptacle for use in a public venue that receives waste and automatically compacts the waste at a 20:1 compaction ratio.

In accordance with a further feature of the present invention, at least one sensor detects an event by the user and triggers the waste receptacle to perform a function. A motion sensor detects movement in proximity to the hatch, and actuates the hatch to move to an open position. A weight sensor detects a predetermined weight in the lower portion of the waste receptacle, and signals to a waste collection service to pick up the compacted waste. An olfactory sensor detects a specific smell, and signals to a law enforcement department upon detection.

In accordance with a further feature of the present invention, the waste receptacle joins with a display device. The display device may position above the waste receptacle, forming an integral unit. The display device shows an advertisement or message that is pertinent to a user in proximity to the waste receptacle. The display device may be an interactive touch screen.

In accordance with yet another feature, an embodiment of the present invention includes a camera for recording the user image. The camera can work in conjunction with recognition software to identify the type of waste being deposited. In this manner, recyclable waste may be segregated more effectively. Also, a face can be recognized for matching with a face in a law enforcement database. In this manner, persons of interest to law enforcement may be detected. This may be especially useful in public venues, such as train stations and airports.

In accordance with a further feature of the present invention, a speaker emits an audio signal towards the user. The at least one event may trigger the speaker to emit the audio signal. The audio signal may include, without limitation, a human voice, a beep, an advertisement, a command, travel information, news, and a warning. The speaker may work in conjunction with the display device, or independently.

In accordance with a further feature of the present invention, a Quick Response (QR) code positions on the waste receptacle or the display device. The user can scan the QR code with a smart phone, or other similar electronic device capable of, or configured to, read QR codes. The scanned QR code provides an instant response that may include advertising, the latest product brochure, or special savings offer on the smart phone.

In accordance with another feature, an embodiment of the present invention also includes interactive media that detect at least one event from the user and perform an interactive function in response. The interactive media includes radio frequency identification (RFID) tags and near field communication (NFC) technology. This interactive media allows the user to position a smart phone in proximity to the RFID tag on the waste receptacle to receive a message or advertisement on the smart phone.

Although the invention is illustrated and described herein as embodied in an interactive waste receptacle, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of an object. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
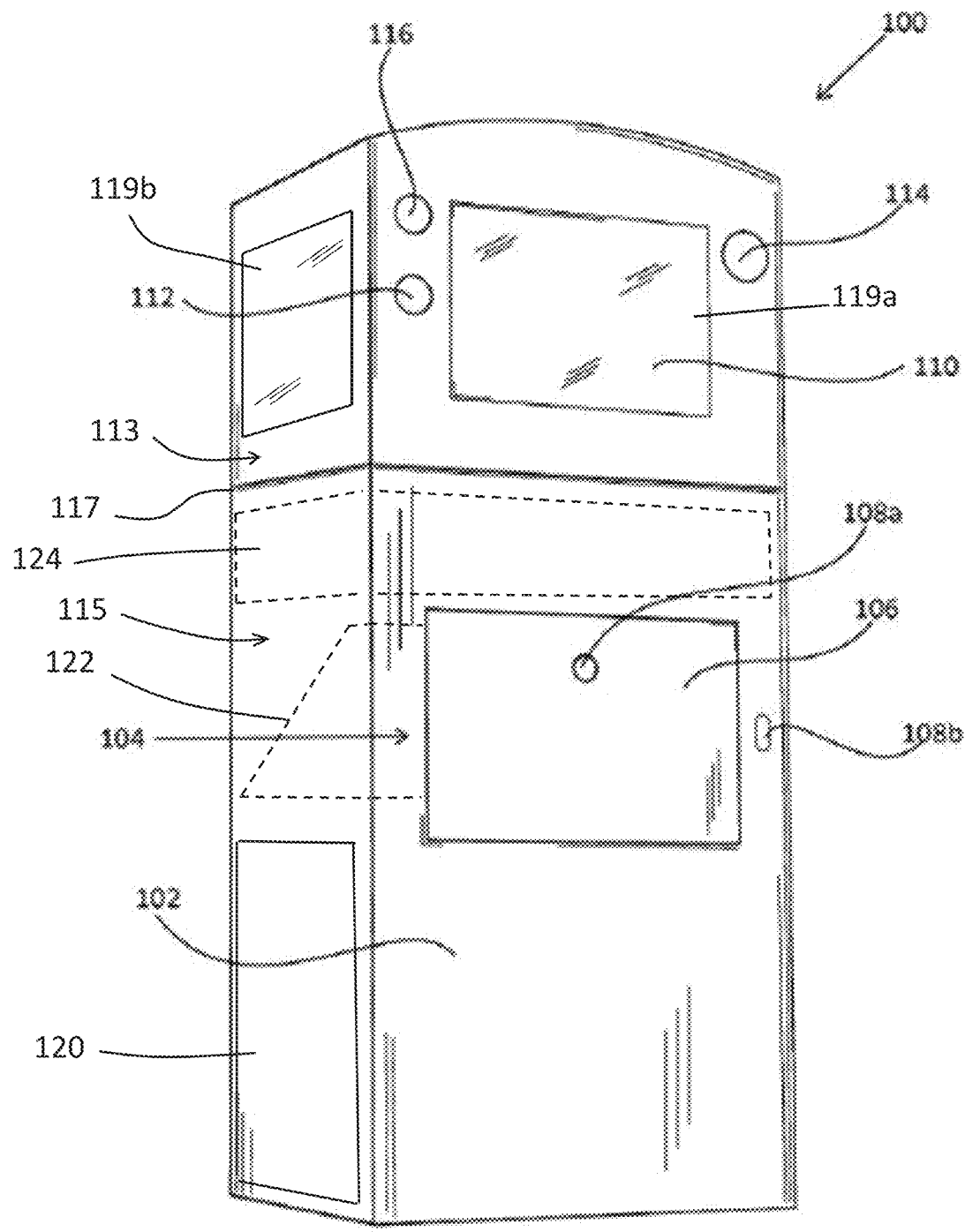
FIG. 1 is perspective side view of an interactive waste receptacle displaying an advertisement graphic in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient interactive waste receptacle for use in high-traffic public venues that is adapted for operation with the newest in electronic technology for such uses as, collecting and processing recyclable waste, advertising electronically, capturing data, recognizing facial features, providing electronic communication, interacting with users, detecting bombs, calculating carbon emission, incentivizing recycling, determining a location of a user, and many other advantages. Embodiments of the invention provide a sophisticated waste receptacle with an electronic display device screen attached thereto. In addition, embodiments of the invention provide sensors, cameras, speakers, and interactive media for detecting and recording events from a user, and electronic communication abilities for transmitting data to a database.

Referring now to FIG. 1, one embodiment of the present invention is shown in a perspective front view. FIG. 1 shows several advantageous features of the present invention, but, as will be described below, the invention can be provided in several shapes, sizes, combinations of features and components, and varying numbers and functions of the components. The first example of an interactive waste receptacle 100, as shown in FIG. 1, includes a waste receptacle 102 with a waste intake aperture 104 covered by a movable hatch 106. The waste intake aperture 104 places waste into an internal chute 122 disposed within the waste receptacle 102. The internal chute 122 transports the waste from the waste intake aperture 104 to a lower portion of the waste receptacle 102. A mechanism 124 for automatically compacting the waste in the lower portion of the waste receptacle 102 is provided within the waste receptacle 102. The mechanism 124 for compacting waste contents can be similar to that described in U.S. Pat. Nos. 5,690,025, 6,701,832, and 7,096,780.

At least one sensor 108a, 108b is configured to detect at least one event by the user, and trigger the waste receptacle 102, a display device 110, a camera 112, a speaker 114, and a plurality of interactive media to perform a responsive interactive function. In one embodiment, the at least one sensor 108a includes a motion sensor that detects when the user is in proximity of the hatch 106. The motion sensor may emit microwave pulses that serve to measure changes from the reflection off the user. A control portion (not shown) receives a signal from the motion sensor to actuate the hatch to an open position for receiving the waste. The control portion may also be programmed to activate the waste compacting mechanism to compact the waste in the lower portion of the waste receptacle 102 after the at least one sensor 108a registers a predetermined number of waste deposits, or when a predetermined weight has been recorded by the weight sensor. In one embodiment, the at least one sensor 108a, 108b emits a signal, such as a notification message electronically to employee(s) responsible for emptying waste from the compactor. Those skilled in the art will recognize that real time notification reduces random labor to check each waste receptacle 102 for service and introduces software operated route management. In some embodiments, the notifications may occur through radio frequencies, or a web based wireless notification system alert.

In some embodiments, the at least one sensor 108a detects when the hatch 106 is oriented in the closed or open position and reports this information to the control portion. The hatch 106 can selectively block the entrance of the internal chute when compacting is taking place so that waste or, more importantly, a user's hand, is prevented from entering the waste receptacle 102 during this process. A mechanical actuator mechanism (not shown) can be provided to deploy the hatch 106 to stop automatically when the control portion is operating the compacting mechanism. The at least one sensor 108a, 108b may include, without limitation, a motion sensor, a thermal sensor, a sound sensor, an olfactory sensor, and a weight sensor.

The compacted waste may be removed from the lower portion of the waste receptacle 102 via a door 120 that opens to allow access through the side of the waste receptacle 102. The at least one sensor 108b can be provided and disposed to detect when the door 120 is closed and locked and report this information to the control portion, which can be programmed to prevent the waste compacting mechanism from operating unless the door 120 is closed and locked. When the door 120 is open, a switch can be provided to open and deprive the waste compacting mechanism of the power needed to operate. In some embodiments, the at least one sensor 108b may detect when enough compacted waste has been accumulated to warrant emptying the waste can 100 and to report this information to the control portion, which signals for the attendant to remove the accumulated, compacted waste.

Those skilled in the art, in light of the present teachings, will recognize that by compacting the waste where it is created, the waste receptacle 102 may help reduce carbon emissions through reduced human labor, fewer trips by the trash hauler and less space used in landfills. The incentivizing of recycling by facilitating the process and giving awards and prizes also works to reduce the carbon footprint. Additionally, practicing smarter recycling yields a public value proposition that is currently underutilized.

In some embodiments, the waste receptacle 102 may include a display device 110 for displaying an image for viewing by the user. The display device 110 can be any display device 110 capable of displaying electronic content, for example, an LCD screen. The display device 110 may position above the waste receptacle 102, forming an integral unit. This prominent positioning of the display device 110 maximizes exposure for advertising and message delivery functions. However, in some embodiments, the display device 110 integrates into the waste receptacle 102, at a mid point. It is significant to note that the interactive waste receptacle 100 allows advertisers to deliver different content to multiple networks and display devices 110 simultaneously, thereby staying competitive in the price point of low cost advertising.

In some embodiments, the display device 110 is interactive, i.e., a touch screen, and allows users to input data. For example, the user may utilize the touch screen to inquire about the type of waste accepted in the waste receptacle 100, a flight schedule, news, or any other information. In yet another embodiment, the touch screen may be utilized to perform financial transactions, including, without limitation, purchasing tickets, paying bills, recharging phone cards, paying parking tickets, paying municipal bills, checking bus routes, and checking winning lottery numbers. The touch screen 110 may simultaneously show a video pertinent to the financial transaction. In other embodiments, the waste receptacle 100 features multiple display devices 110, with the display devices 110 being located on various sides of the waste receptacle 100. Having multiple display devices 110 allows users to view the image from any angle of the waste receptacle 100. In one embodiment, the display device 110 includes two or more liquid-crystal display device screens 119a, 119b for viewing on multiple sides of the waste receptacle 100. The screens 119a, 119b work independently from each other and allow for multiple users to interact in different ways with the waste receptacle 100.

The waste receptacle 100 also features a plurality of interactive elements for capturing user events. The interactive elements may include, without limitation, a camera 112, a touchscreen 110, and a microphone 116. However, additional interactive elements may be utilized, including, without limitation, recognition software, near field communication (NFC) technology, radio frequency identification (RFID) tags, and Quick Response (QR) codes. As an ancillary function to the interactive media, the waste compacter 102 may include a web portal and sockets for providing bandwidth and internet access to the user. Also, special software applications that function with the integrated waste receptacle 100 may be downloaded to enhance integration of the advertisements and messages with the user's smart phone, or other applicable communication devices.

The camera 112 records images of the user and any other object in proximity to the waste receptacle 100. The captured images may include a photograph, a facial image, a body image, and a video. The images may then be used in conjunction with recognition software and other interactive media to trigger the at least one interactive function. The camera 112 can receive images of anyone or anything standing in the vicinity of the waste receptacle 102. In some embodiments of the present invention, where multiple display devices 110 are provided, multiple cameras 112 can also be provided to capture multiple users standing at multiple angles around the waste receptacle 102. Those skilled in the art will recognize that municipalities, cities, and counties are all under extreme financial pressure affecting the level of public service provided due to personnel cuts. By offering digital cameras and environmental sensors as integrated options inside the interactive waste receptacle, an immediate increase in public safety is realized at nominal cost.

In one embodiment of the present invention, video and/or images recorded by the camera 112 are fed to one or more law enforcement departments. The video and/or images can be sent in their raw format or they can be analyzed by the recognition software prior to sending. The analysis would include standard facial recognition calculations. Placing the camera 112 and providing facial recognition services provides great advantages over current technology. Those skilled in the art, in light of the present teachings, will recognize that even when trying to hide their face, it is difficult for someone to avoid a camera 112 that is placed at or about chest height. This provides a much better view of the person's face then does the typical ceiling mounted cameras of public places. Second, most people will not expect a waste receptacle to have a camera 112 and would not naturally think to hide their face from the waste receptacle 102 like they would from the traditional ceiling mounted cameras. For example, without limitation, the integrated waste receptacle 100 may be configured to transfer web based distribution of a camera view to homeland security, local/regional security and facility management. This feature could be especially valuable at places such as airports, where heightened security is usually necessary.

Those skilled in the art are also aware that, aside from security reasons, facial recognition can be valuable for other purposes. The present invention may integrate facial recognition with advertising functions. One of the goals of advertising is to place content in front of the demographic that is most likely to be interested in the advertising content. For example, it does little good to place an ad for skateboards in front of persons over 60 years of age. On the other hand, displaying skateboard ads to males between the age of 10 and 18 would be very effective. Facial recognition can help place the correct ad in front of the correct viewer. More specifically, the camera 112 can be used to identify a type of a person. Images recorded by the camera 112 can be run through facial recognition software to determine demographics of the person. For example, the face of a male can usually be readily distinguished from the face of a female. Instantly, certain types of ads can be eliminated and certain types of ads can be chosen to be instantly displayed on the display device 110 based on who is standing in front of the camera 112. Going further, an estimated age of the viewer can quickly be determined and certain ads can be eliminated and certain ads can be chosen based on the age of the viewer. It is possible to go even further, for example, determining ads based on race, types of clothing, contents of the person's hands, e.g., GUCCI purse, and other indicators of a person's interest.

In some embodiments, the speaker 114 emits and/or receives an audio signal. The speaker 114 emits an audio signal towards the user and the microphone 116 receives an audio signal, such as a command, from the user. In loud, crowded public venues, the audio signal may be necessary to catch the user's attention. The speaker 114 operates in conjunction with the display device 110, producing an audio signal that corresponds to content on the display device 110. The audio signal may function in coordination with the display device 110. However, in another embodiment, the audio signal may be independent, and triggered by user interaction.

In one commercial embodiment, the interactive waste receptacle 100 integrates a low cost advertising element onto the waste receptacle 100, which goes beyond the display device 110. For example, a user could pay a fee to wrap the waste receptacle 102 with their logo/advertisement, insert a graphic ad sheet, or use smaller poster advertising for costs ranging between $50 to $500 per month as the market dictates.

In yet another commercial embodiment, the interactive waste receptacle 100 can work in conjunction with a user's smart phone to send and receive marketing material. This form of graphic advertising performs text-based messaging and allows the user to scan QR codes through their smart phones, or other communication devices. For example, without limitation, an automobile company might wrap the waste receptacle 102 with its logo and latest offering. Included in the advertisement design may be a text based code, such as "3456", or QR code equivalent so that, when entered or scanned into a smart phone by the user, provides an instant response. The response may include the latest product brochure or special savings offer on the user's smart phone.

In one alternative embodiment, the interactive waste receptacle 100 may provide extra bandwidth to the user. In a public venue, such as an airport, the user may require internet access while waiting for a flight. The internet access requires bandwidth. Technology users connect to this bandwidth to access the internet for web surfing on mobile devices, placing phone calls and other data activities. The interactive waste receptacle 100 can offer bandwidth access in public places for a fee or through value swapping with the public facility or local government. The fee for internet access can simply be the user entering their email address. In other embodiments, it may be a monetary fee.

In yet another alternative embodiment of the present invention, the integrated waste receptacle 100 integrates software applications that allow it to serve, not only as an advertising waste collection point, but also as a public service terminal (PST). In a public venue, the PST, combined with software applications, creates myriad interactive function options for the user. Some examples of application services that may be offered securely through a Smart Life software application and a PST are: phone based real time parking meters with automatic payment for parking; secure public utilities payment center geo-location, which is based on a global positioning system; discounts and offers to consumers based on proximity to the PST; real-time anonymous data tracking for geo-location; and data collection by the PST for recording and analyzing consumer trends. Additionally, government and public service messages can be distributed from central locations to the Smart Life application in the PST, or on the display device 110. Examples of such communications may include, without limitation, emergency management alerts, missing persons, crisis response instructions, and tourist information in multiple languages.

Figure 2:
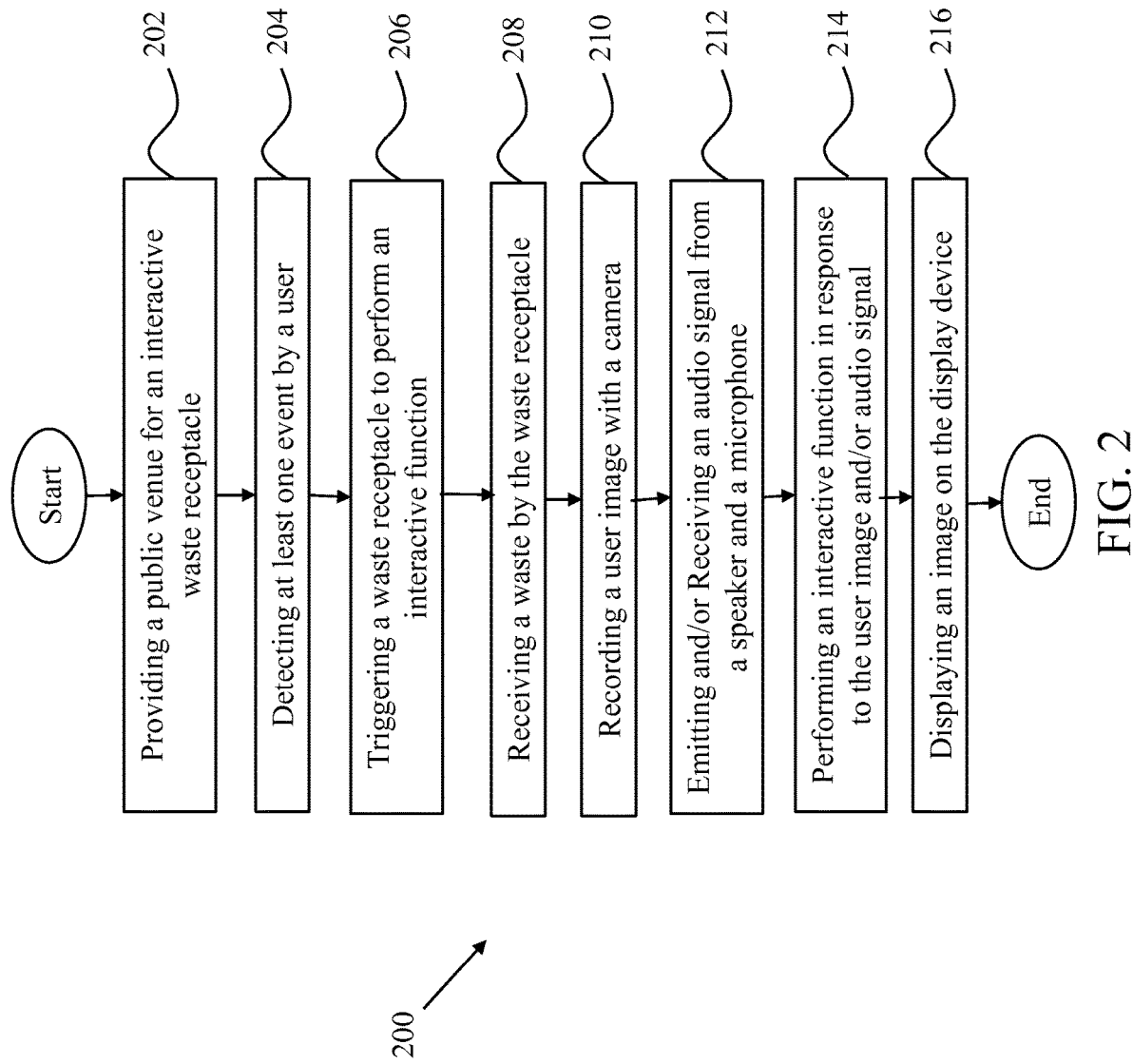
FIG. 2 is a flowchart diagram of a waste disposal method, in accordance with the present invention.

Turning now to FIG. 2, the interactive waste receptacle 100 receives waste, displays images, and performs interactive functions in a public venue. In a waste disposal method 200, the interactive waste receptacle 100 combines a waste receptacle 102, a display device 110, at least one sensor 108, a camera 112, a speaker 114, and a plurality of interactive media elements to detect and record at least one event from a user, and respond to the event with at least one interactive function, including: receiving, compacting, and processing a waste; detecting proximal images, sounds, and smells; and displaying content such as advertisements, text, graphics, animation, video, audio, and games. In an initial Step 202 of the method, a public venue is provided for placing the interactive waste receptacle 100. Those skilled in the art will recognize that a public venue has many potential users that require disposing of waste, whether it is refuse waste, or recyclable waste. The interactive waste receptacle 100 may then interact with the users to achieve a desired goal. The public venue may include, without limitation, an airport, a train station, a bus station, a grocery store, a mall, a convention center, an office building lobby, a circus, and a central square in a downtown district.

The method may then proceed to a Step 204 of detecting a user. The user may be in proximity to the interactive waste receptacle 100. At least one sensor 108a, 108b can be disposed to detect an event by the user, and actuate with an appropriate function by the waste receptacle 102. The at least one sensor 108a, 108b may detect movement, thermal energy, sound, and smells, and then act accordingly. The at least one sensor 108, 108b may also detect the weight of the waste, and the mechanical functions of the waste receptacle 102. A Step 206 comprises triggering the waste receptacle 102 to perform at least one interactive function in response to the at least one event. In one embodiment, the at least one sensor 108 may include a motion sensor that detects when the user is in proximity to the hatch 106. The control portion receives a signal from the motion sensor to actuate the hatch to an open position for receiving the waste. The control portion may also be programmed to activate the waste compacting mechanism to compact the waste in the lower portion of the waste receptacle 102 after the at least one sensor 108b registers a predetermined number waste deposits, or when a predetermined weight has been recorded by the weight sensor. At a Step 208, the waste receptacle receives the waste for disposal and compacting. The user places the waste into an internal chute disposed within the waste receptacle 102. The internal chute transports the waste from the waste intake aperture 104 to a lower portion of the waste receptacle 102. A mechanism for automatically compacting the waste in the lower portion of the waste receptacle 102 is provided within the waste receptacle 102. The waste receptacle 102 can be selective in receiving specific types of waste.

The method may then perform a Step 210 of recording a user image with the camera 112. The camera 112 may record the image of the user and any other object in proximity to the waste receptacle 102, such as the waste itself. The image may include a photograph, a facial image, a body image, and a video. The image may then be used in conjunction with recognition software and other interactive media to trigger the at least one interactive function. The camera 112 may be sufficiently adjustable to orient up to 360° for recording images of anyone or anything standing in the vicinity of the waste receptacle 102. A Step 212 includes emitting and/or receiving an audio signal with the speaker. The speaker 114 can operate in conjunction with the display device 110 and produce an audio signal that corresponds to content on the display device 110. The speaker 114 emits an audio signal towards the user, or receives an audio signal, such as a command from the user. The at least one event may trigger the speaker 114. For example, without limitation, the camera 112 detects a user riding a wheel chair. The speaker 114 may be triggered to play a programmed message informing the user about wheel chair accessible exits.

The method further includes a Step 214 of performing the at least one interactive function in response to the image and/or the audio signal. The waste receptacle 102 also features interactive media for detecting at least one event by the user, and performing at least one interactive function in response to the at least one event. The interactive media may include, without limitation, the camera 112 and the speaker 114. However, additional interactive media may be utilized, including, without limitation, recognition software, NFC technology, RFID tags, and QR codes.

A final Step 216 includes displaying an image on the display device 110. The display device 110 may position above the waste receptacle 102 for maximizing visual exposure. In this manner, the image displays prominently in the public venue. In other embodiments, the waste receptacle 102 features multiple display devices 110, with the display devices 110 being located on various sides of the waste receptacle 102. The image may include, without limitation, an advertisement video, a photograph, text, graphics, video, and games. The display device 110 can be any display device 110 capable of displaying electronic content, for example, an LCD screen. In some embodiments, the display device 110 is an interactive touch screen, and allows users to input data. For example, the user may utilize the touch screen to inquire about the type of waste accepted in the waste receptacle, or a flight schedule, or news.

Figure 3:
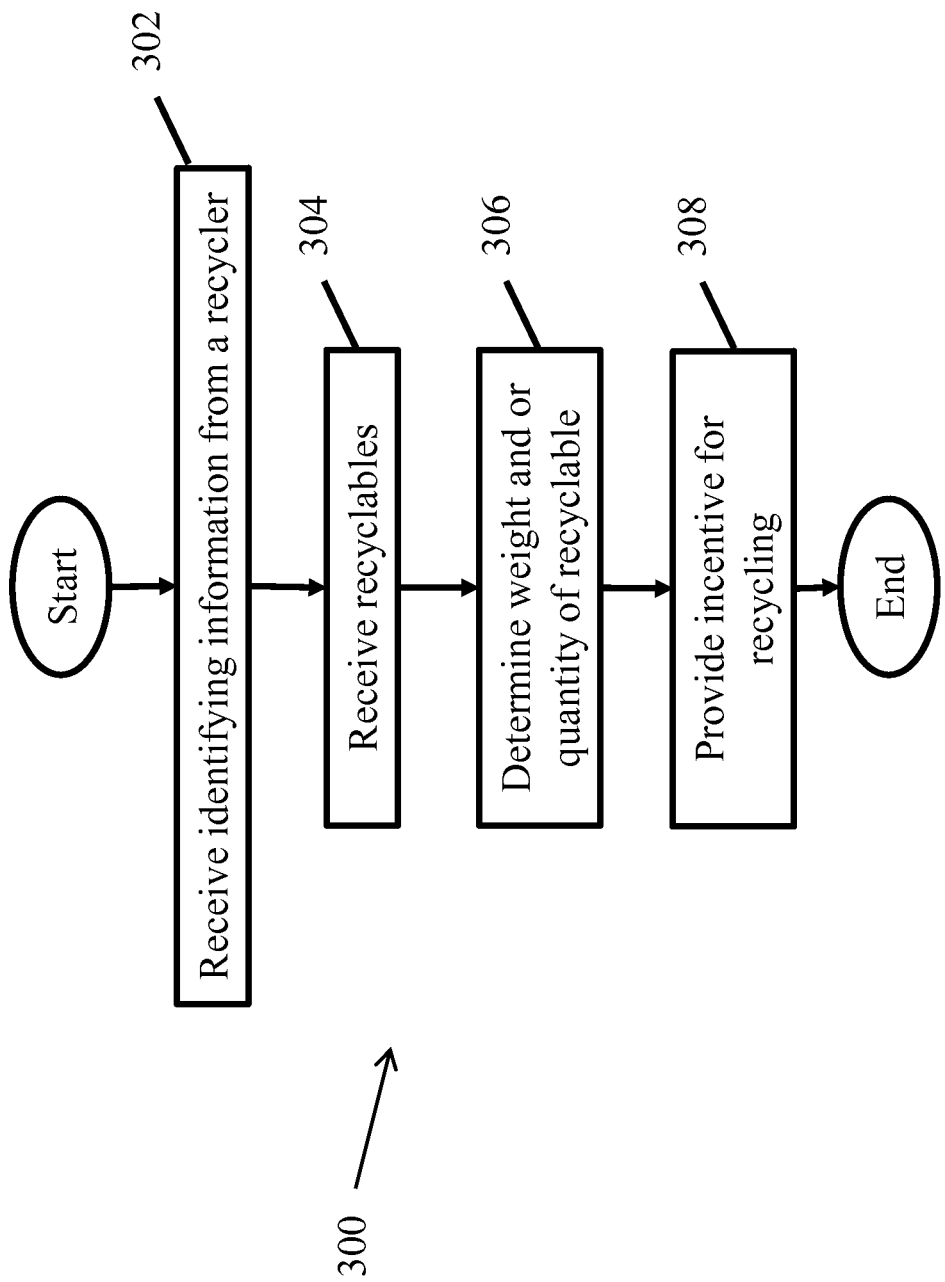
FIG. 3 is a flowchart diagram of an embodiment of a system that provides incentivized recycling, in accordance with the present invention.

FIG. 3 is a schematic block diagram of an embodiment of a system 300 that provides incentivized recycling. The incentives for placing recyclable items in a recycle container could include credits, coupons, cash payments, free or discounted internet connection, or the like. For example, a recycler who places a recyclable bottle into the recycle container may be able to receive free airport internet access for a limited time period. For instance, when the recycler places one empty bottle into the recycle container, the recycler receives ten minutes of free internet, such as free airport internet, park internet, school internet, business internet or the like. The length of time for which the recycler will be allowed free or discounted internet access may be adjusted according to the specifications of the facility owner. Alternatively, the recycler may be provided with a coupon that can be redeemed for a discount at a business. This is useful when the recycle container is positioned in close proximity to the business providing the coupon, such as businesses in airports, which would stimulate spending.

It is preferred, but not required, that the recycle container in the method of FIG. 3 be an automatically compacting waste can, such as the top loading, automatically compacting waste can for high-traffic public venues found in U.S. Pat. No. 7,096,780. At block 302, the recycling container receives identifying information from a recycler. The identifying information could be provided via Bluetooth connectivity, Wi-Fi, near field communication, or manually entered into the recycle container interface through an interface, such as a touch screen display device, keypad, face recognition software, finger print, retina scan or the like. Alternatively, the recycle container may provide a QR code that allows the recycler to read the QR code using an imaging device on a smart phone, or other similar electronic device capable of, or configured to, read QR codes. By reading the QR code, the recycler is then able to facilitate the transmission of identifying information over the internet or other similar type of network via the smart phone or other electronic device to the recycle container or a backend server capable of associating the placement of recycled materials into the recycle container to the recycler.

At Block 304, the recycle container receives recyclables from the recycler. At Block 306, the recycle container is configured to, and capable of, weighing or otherwise determining the quantity of recyclables provided by the user. At Block 308, the recycle container facilitates transfer of an incentive to the recycler. As described above, the incentive could include without limitation credits, coupons, cash payments, free or discounted internet connection, or the like. It is contemplated that incentives may be facilitated via electronic transfer to the recycler or otherwise transferred to the recycler's benefit, such as a direct transfer to a store or stores. Alternatively, the incentive may be provided in paper form to the recycler at the recycle container terminal.

While the method describes the steps of first receiving identifying information from a recycler and then the recycle container receives the recyclable materials placed into the container by the recycler, it is not required that the steps occur in this order. It is just as sufficient to receive the recyclables into the recycle container and at a later step to then associate the received recyclables to a particular recycler or recycler account.

Figure 4:
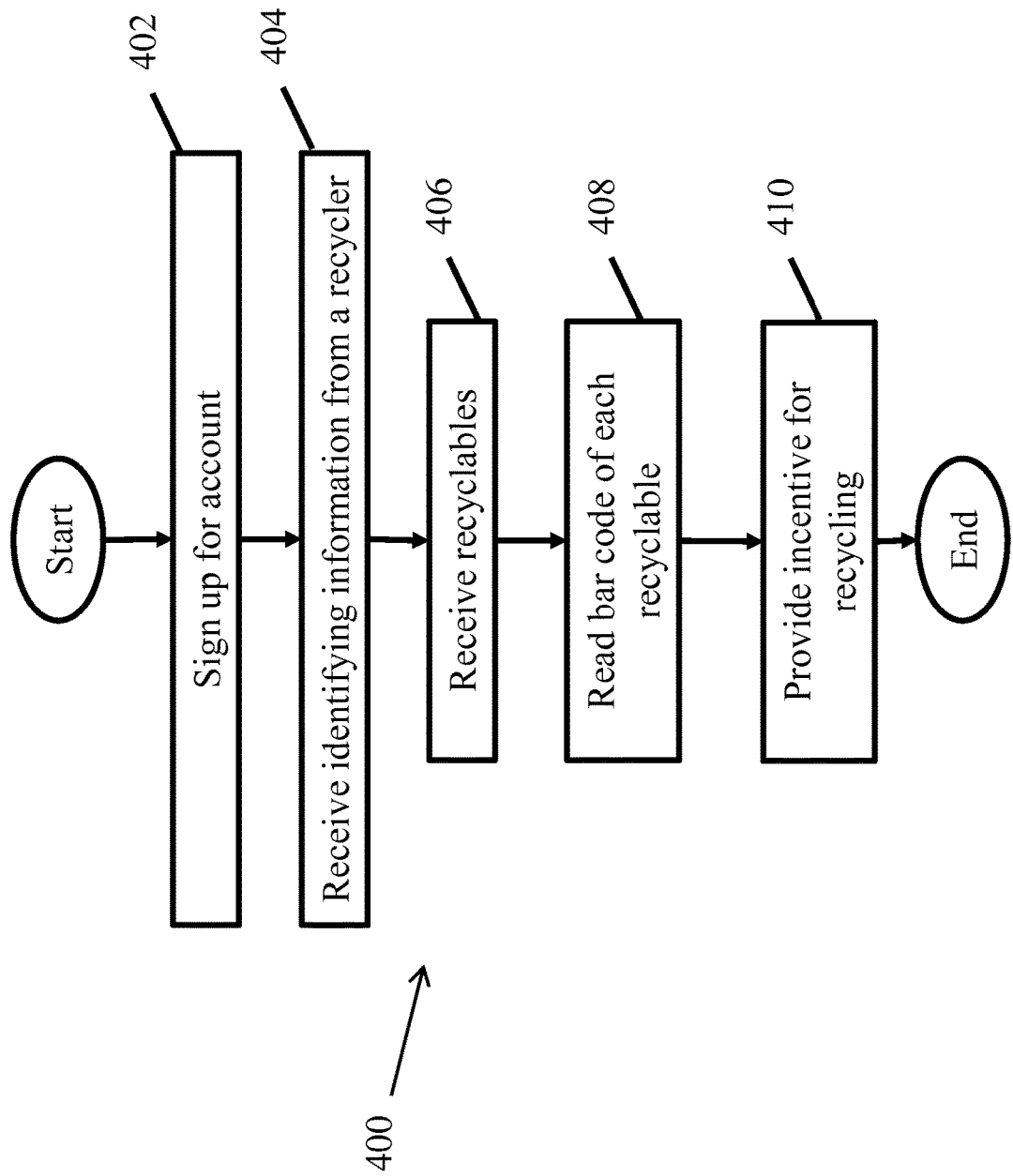
FIG. 4 is a flowchart diagram of an embodiment of a system that provides incentivized recycling though the use of interactive media, in accordance with the present invention.

FIG. 4 is a schematic block diagram of an embodiment of a system 400 that provides incentivized recycling. The incentives for placing recyclable items in the recycle container could include credits, coupons, cash payments, free or discounted internet connection, or the like. For example, a recycler who places a recyclable bottle into the recycle container may be able to receive free airport internet which could in turn also be limited to a particular time period. For instance, when the recycler provides one empty bottle into the recycle container, the recycler receives a ten percent discount internet, such as airport internet, city internet, park internet, school internet, business internet or the like. The length of time for which the recycler will be allowed free or discounted internet may be adjusted according to the specifications of the facility owner. Alternatively, the recycler may be provided with a coupon that can be redeemed for a discount at a business, such as ten percent off of a sandwich. This is useful when the recycle can is positioned in close proximity to the business providing the coupon, such as businesses in airports, which would stimulate spending.

It is preferred, but not required, that the recycle container in the method described in the block diagram of FIG. 4 be an automatically compacting waste can, such as the top loading, automatically compacting waste can for high-traffic public venues found in U.S. Pat. No. 7,096,780. At block diagram 402, the recycler signs up for an account. The account may be a recycling reward account that is utilized in order to facilitate transfer of prizes, coupons, discount counts, and the like. The recycling account may be linked to a credit, bank account, or the like, in order to provide cash incentives back to the recycler in accordance with the embodiments of the present invention. At block 404, the recycling container receives information from a recycler that identifies the recycler award account, thereby associating the recycler to the user account. The identifying information could be provided via Bluetooth connectivity, wi-fi, near field communication, or manually entered into the recycle container interface through an interface, such as a touch screen display device, keypad, face recognition software, finger print, retina scan or the like. Alternatively, the recycle container may provide a QR code that allows the recycler to read the QR code using an imaging device on a smart phone, or other similar electronic device capable of, or configured to, read QR codes. By reading the QR code, the recycler is then able to facilitate the transmission of identifying information over the internet or other similar type of network via the smart phone or other electronic device to the recycle container or a backend server capable of associating the placement of recycled materials into the recycle container to the recycler. At Block 406, the recycle container receives recyclables from the recycler. At Block 408, the recycler container is configured to, and capable to, scan bar codes on the recyclable to associate the recyclable to the recycler reward account. By way of scanning the recyclable, the recycler container system is able to associate a weight, size, and value of the recyclable. In an embodiment, a database, located locally at the recycler container or remotely at a distant location may be accessed to determine the value associated with the bar code, QR code, or the like and thereby assign a value to the recycler's reward account or otherwise provide coupons, cash or the like to the recycler. In this case, the database may associate a value based on the barcode. For example, a bar code for a 2-liter plastic bottle may be of greater recycle value than a pint sized bottle, thus, scanning the bar code allows the recycle container to accurately determine the value associated with the recyclable without consideration to variations in weight due to liquids contained within the plastic bottle. As described above, the incentive could include without limitation credits, coupons, cash payments, free or discounted internet connection, or the like. With the proliferation of mobile devices, camera based bar code scanners have increased in popularity. Thus, it is contemplated within the spirit of the instant invention that any scanner, such as a red line scanner or a camera system may be configured to accomplish the instant invention. At block 410, the recycle container facilitates transfer of an incentive to the recycler. As described above, the incentive could include without limitation credits, coupons, cash payments, free or discounted internet connection, or the like. It is contemplated that incentives may be facilitated via electronic transfer to the recycler or otherwise transferred to the recycler's benefit, such as a direct transfer to a store or stores. Alternatively, the incentive may be provided in paper form to the recycler at the recycle container terminal.

Figure 5:
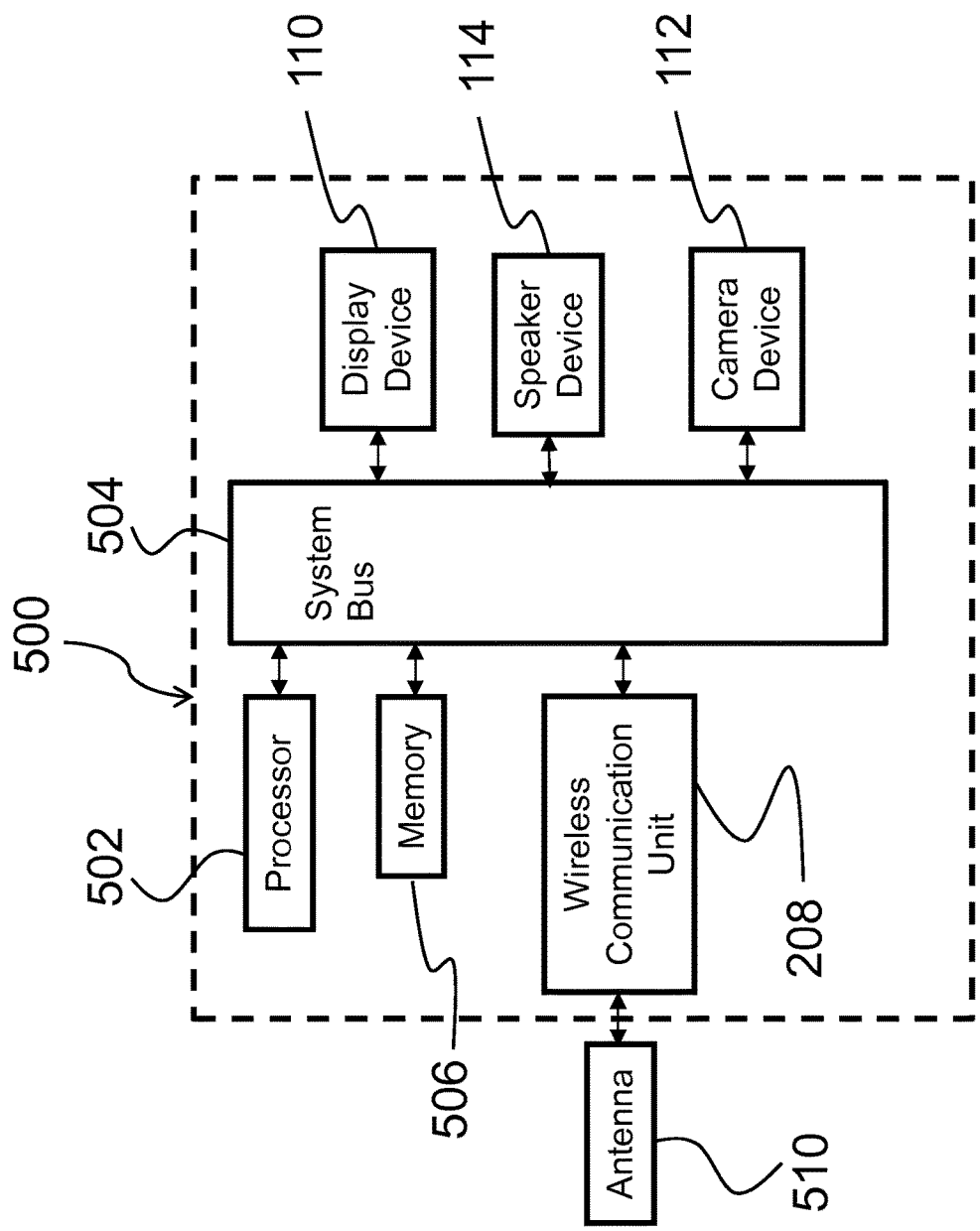
FIG. 5 is a block diagram of processing and communication system of the interactive waste receptacle, in accordance with the present invention.

FIG. 5 is a block diagram of processing and communication system of the interactive waste receptacle 100. The processing and communication system 500 includes a processor 502 for processing digital data. The components of the wireless communication device may be interconnected via a system bus 504 or other known methods of interconnecting device components. The processor 502 communicates through the bus 504 to control data storage in a memory module 506.

The processor 502 also controls the display device 110, the speaker 114, and the camera 112, which are all connected through the system bus 504. In one embodiment, data in the memory 506, for example, a video commercial, is caused by the processor 502 to display device on the display device 110 and audio is broadcast through the speaker 114.

The processing and communication system 500 also includes a wireless communication unit 508 and an antenna 510. The wireless communication unit 508 and antenna 510 operate in conjunction to transmit and receive wireless signals to and from other sources. Transceivers are well known in the art. The wireless exchange of digital information between the processing and communication system 500 can be implemented via a network for wireless communication, such as any type of satellite, Wi-Fi, infrared, Near field communication, Bluetooth, or other communication networks.

Figure 6:
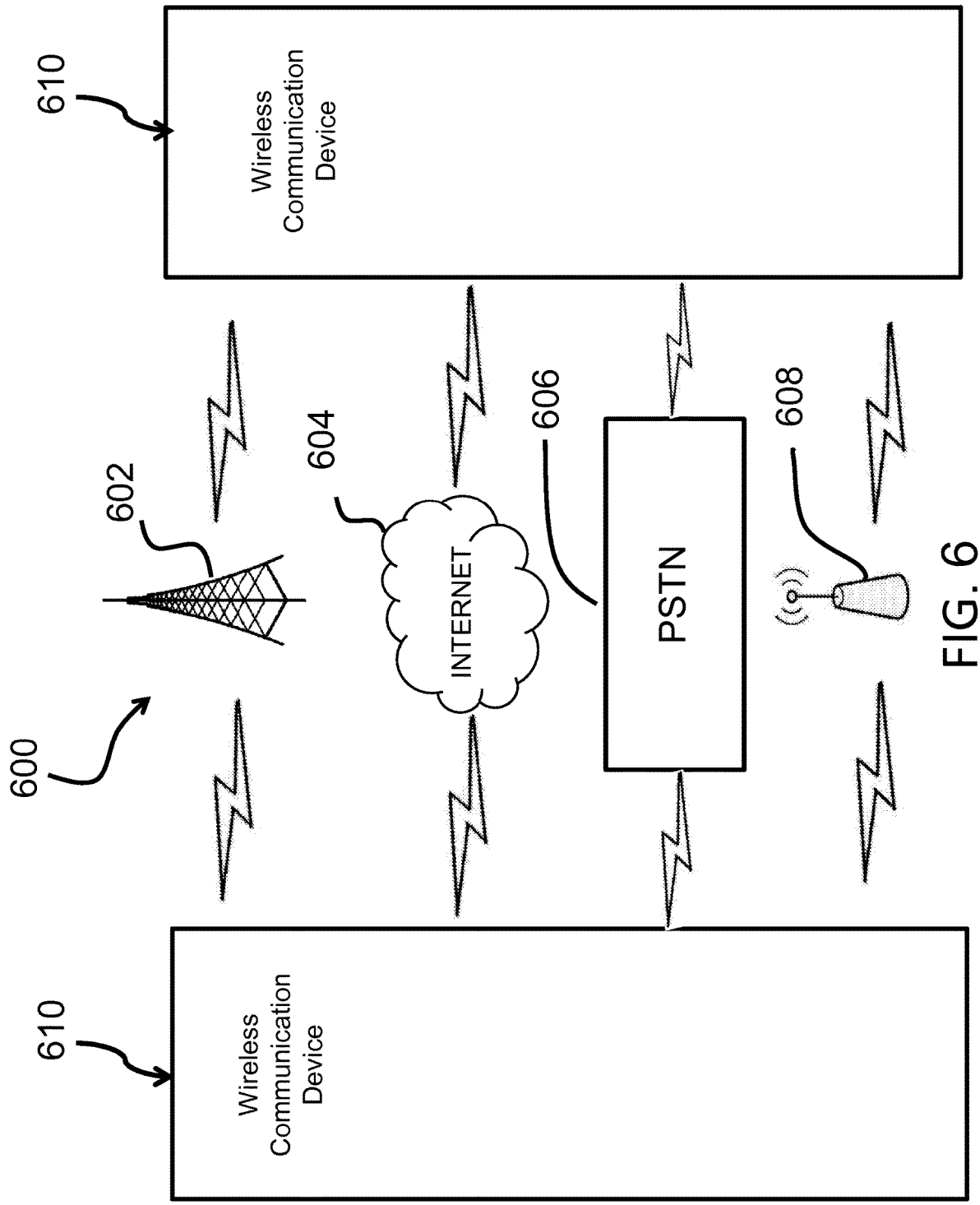
FIG. 6 is a block diagram of the wireless communication between at least two wireless communication devices, in accordance with the present invention.

FIG. 6 is a block diagram of the wireless communication between at least two wireless communication devices 610 in accordance with the principles of the present invention. The at least two wireless communication device 610 may communicate using a PTT RF transmissions for wireless communication. The sound received by any of the wireless communication device 610 may be output from a speaker on either the wireless communication device 610 and/or a portable game device. In operation, the wireless transmission unit may transmit or receive across any type of communications network 600. Examples of networks include the World Wide Web and the internet 604, either of which may be facilitated via various embodiments for radio communications such as a cellular communication network 602 and the public switched telephone network (PSTN) 606, or any other wide area network (WAN), as well as local area networks (LANS), such as an Ethernet LAN 608. Yet further, the network 600 may include High Speed Downlink Packet Access (HSDPA) systems, Global System for Mobile Communications (GSM) including General Packet Radio Services (GPRS) systems, Enhanced Data Rates for Global Evolution (EDGE) systems, CDMA/1xRTT systems, Evolution-Data Only or Evolution-Data Optimized (EV-DO), Evolution for Data and Voice (EV-DV) systems, High Speed Uplink Packet Access (HSUPA) systems, and any other like networks. The cellular communication network may include Code Division Multiple. The network 600 may additionally be a wireless network, such as any type of satellite, Wi-Fi, ZigBee, infrared, Near Field Communication, Bluetooth, or other communication networks. The network is not limited to any particular system and method of data communication and may combine any type of system and method for facilitation of data across the network 600.

An interactive waste receptacle 100 has been disclosed that that receives and processes waste, performs interactive functions, and relays pertinent information through a host of interactive communications with a user.

What is claimed is:

1. An interactive waste receptacle for advertising and receiving waste at or in an indoor public venue, comprising:
   a lower body portion including a waste receptacle and having multiple sides that define an exterior shape and having a height of approximately 4.5 feet;
   a hatch in the lower body portion, the hatch operable to regulate access to an internal chute located within the lower body portion, the internal chute configured to direct the waste to the waste receptacle for compacting;
   a door on a side of the lower body portion configured to allow access to the waste receptacle;
   an upper body portion which meets the lower body portion and is positioned above and joinable to the lower body portion and having multiple sides that define an exterior shape that substantially matches the exterior shape of the lower body portion;
   at least one sensor, the at least one sensor being configured to detect at least one event from a user for triggering the interactive waste receptacle to perform at least one interactive function;
   a wireless communication unit disposed in the upper body portion which receives electronic content including digital video advertising content with image content; and
   at least two display device screens capable of displaying electronic content, each display device screen being a liquid crystal display, and each being entirely disposed on a different one of the multiple sides of the upper body portion of the interactive waste receptacle with one on a same side of the interactive waste receptacle as the hatch, each communicatively coupled to the wireless communication unit, and each configured to display the digital video advertising content for viewing by the user on the respective sides of the upper body portion.

2. The waste receptacle according to claim 1, further comprising:
   a camera configured to record a user image for performing the at least one interactive function.

3. The waste receptacle according to claim 1, further comprising:
   a speaker configured to emit an audio signal for performing the at least one interactive function.

4. The waste receptacle according to claim 1, further comprising:
   a microphone configured to receive an audio signal for performing the at least one interactive function.

5. The waste receptacle according to claim 1, wherein at least one of the at least two display device screens is an interactive touchscreen.

6. The waste receptacle according to claim 1, wherein the at least one sensor comprises a microwave motion sensor for detecting when the user is in proximity to the hatch, whereby the motion sensor triggers the hatch to move to an open position.

7. The waste receptacle according to claim 1, further comprising:
   a camera; and
   a processor communicatively coupled to the camera and operable to interpret data received from the camera and match the data received from the camera with an image of a human face.

8. The waste receptacle according to claim 1, further comprising:
   a camera; and
   a processor communicatively coupled to the camera and operable to cause at least one of the at least two display device screens to display electronic content including a unique advertisement video tailored for the user based on at least one physical characteristics of the user captured by the camera and detected by the processor.

9. An improved waste receptacle assembly disposed in a publically accessible area, the improved waste receptacle assembly comprising:
   a lower body portion having multiple sides that define an exterior shape, the lower body portion having a height of approximately 4.5 feet and disposed along a walk space of the publically accessible area, and including a hatch configured to receive waste into a waste receptacle, a door on a side of the lower body portion configured to allow access to the waste receptacle, and a compacting mechanism configured to compact waste received through the hatch;
   an upper body portion which meets and is joinable to the lower body portion and is positioned above the lower body portion and having multiple sides that define an exterior shape that substantially matches the exterior shape of the lower body portion;
   a first LCD display device screen disposed entirely on a first side of the upper body portion and configured to display electronic content on the first side of the upper body portion of the improved waste receptacle; and
   a second LCD display device screen disposed entirely on a second side of the upper body portion of the improved waste receptacle and configured to display electronic content on the second side of the upper body portion of the improved waste receptacle;
   wherein the first display and the second display are located at a height of about six feet.

10. The improved waste receptacle assembly of claim 9, further comprising at least one of:
   a motion detector operable to detect movement in proximity to the hatch, wherein the motion detector is a microwave-based motion detector which transmits microwaves and senses reflections of the transmitted microwaves; and
   a microphone configured to receive an audio signal for performing at least one interactive function.

11. The improved waste receptacle assembly of claim 9, further comprising, disposed on the upper body portion, at least one of:
   a camera configured to record a user image for performing at least one interactive function;
   a speaker configured to emit an audio signal for performing at least one interactive function; and
   a bomb detector configured to detect the presence of explosive material in a proximity of the improved waste receptacle.

12. The improved waste receptacle assembly of claim 11, wherein:
   the camera is in communication with a database of face images.

* * * * *